(12) United States Patent
Therien et al.

(10) Patent No.: US 10,411,380 B1
(45) Date of Patent: Sep. 10, 2019

(54) CONNECTORS WITH LIQUID METAL AND GAS PERMEABLE PLUGS

(71) Applicant: Microsoft Technology Licensing, LLC, Redmond, WA (US)

(72) Inventors: Patrick J. Therien, Bothell, WA (US); Spencer N. Persaud, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/988,892

(22) Filed: May 24, 2018

(51) Int. Cl.
*H01R 13/03* (2006.01)
*H01R 13/50* (2006.01)

(52) U.S. Cl.
CPC ............. *H01R 13/03* (2013.01); *H01R 13/50* (2013.01)

(58) Field of Classification Search
CPC ...................................................... H01R 13/03
USPC .................................................. 439/179, 178
See application file for complete search history.

(56) References Cited

U.S. PATENT DOCUMENTS

| | | | | |
|---|---|---|---|---|
| 3,451,609 A | * | 6/1969 | Gillett | H01R 4/723 174/84 R |
| 3,503,034 A | * | 3/1970 | Appleton | H01R 31/00 439/179 |
| 3,622,944 A | | 11/1971 | Tsuchiya et al. | |
| 4,750,525 A | | 6/1988 | Vaughan | |
| 4,762,497 A | * | 8/1988 | Burvee | H01R 4/64 439/179 |
| 4,770,641 A | * | 9/1988 | Rowlette | H01R 9/096 439/178 |
| 5,006,286 A | * | 4/1991 | Dery | H01R 4/04 174/76 |
| 5,167,521 A | * | 12/1992 | Wilfert | H01R 13/52 439/275 |
| 5,377,750 A | * | 1/1995 | Arterbury | E21B 23/02 166/147 |
| 5,522,769 A | | 6/1996 | DeGuiseppi | |
| 5,626,484 A | * | 5/1997 | Okuyama | H01R 3/08 439/179 |
| 5,779,492 A | * | 7/1998 | Okuyama | H01R 3/08 439/179 |
| 5,993,269 A | * | 11/1999 | Ito | H01R 39/646 277/378 |

(Continued)

OTHER PUBLICATIONS

Yang, et al., "From Flexible and Stretchable Meta-Atom to Metamaterial: A Wearable Microwave Meta-Skin with Tunable Frequency Selective and Cloaking Effects", In Journal of Scientific Reports, vol. 6, pp. 1-8, Feb. 23, 2016.

(Continued)

*Primary Examiner* — Tulsidas C Patel
*Assistant Examiner* — Peter G Leigh
(74) *Attorney, Agent, or Firm* — Ranjeev Singh; Singh Law, PLLC

(57) ABSTRACT

Circuit connectors comprising liquid metal and methods of manufacturing such circuit connectors are provided. An example circuit connector includes a stretchable housing including liquid metal having a first viscosity, where the stretchable housing includes a first opening associated with a first end of the stretchable housing. The circuit connector may further include a first gas permeable plug inserted in the first opening, where the first gas permeable plug is not liquid permeable with respect to any liquids having at least the first viscosity.

20 Claims, 4 Drawing Sheets

(56) References Cited

U.S. PATENT DOCUMENTS

| | | | | |
|---|---|---|---|---|
| 6,113,406 | A * | 9/2000 | Lin | H01R 4/00 |
| | | | | 439/179 |
| 6,606,234 | B1 | 8/2003 | Divakar | |
| 7,147,478 | B1 * | 12/2006 | Ju | H01R 3/08 |
| | | | | 439/66 |
| 7,675,303 | B2 * | 3/2010 | Kimura | G01R 31/2805 |
| | | | | 324/724 |
| 7,731,513 | B1 * | 6/2010 | Lin | H01R 13/2421 |
| | | | | 439/179 |
| 8,190,224 | B2 * | 5/2012 | Hoarau | A61B 5/14552 |
| | | | | 600/310 |
| 9,116,145 | B2 * | 8/2015 | Li | G01N 33/50 |
| 9,822,002 | B1 * | 11/2017 | Andry | B81C 1/0038 |
| 2017/0353021 | A1 * | 12/2017 | Chen | G06F 1/1683 |
| 2017/0367179 | A1 | 12/2017 | Holbery et al. | |

OTHER PUBLICATIONS

Eaker, et al., "Liquid Metal Actuation by Electrical Control of Interfacial Tension", In Journal of Applied Physical Review, vol. 3, Issue 3, 41 Pages, Sep. 3, 2016.

* cited by examiner

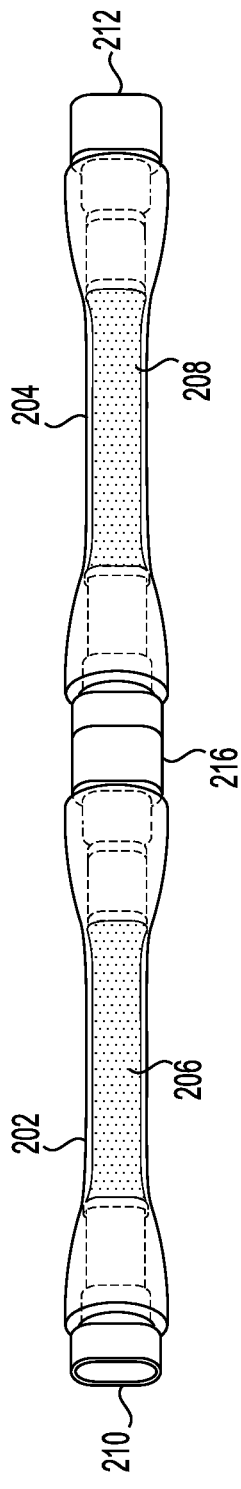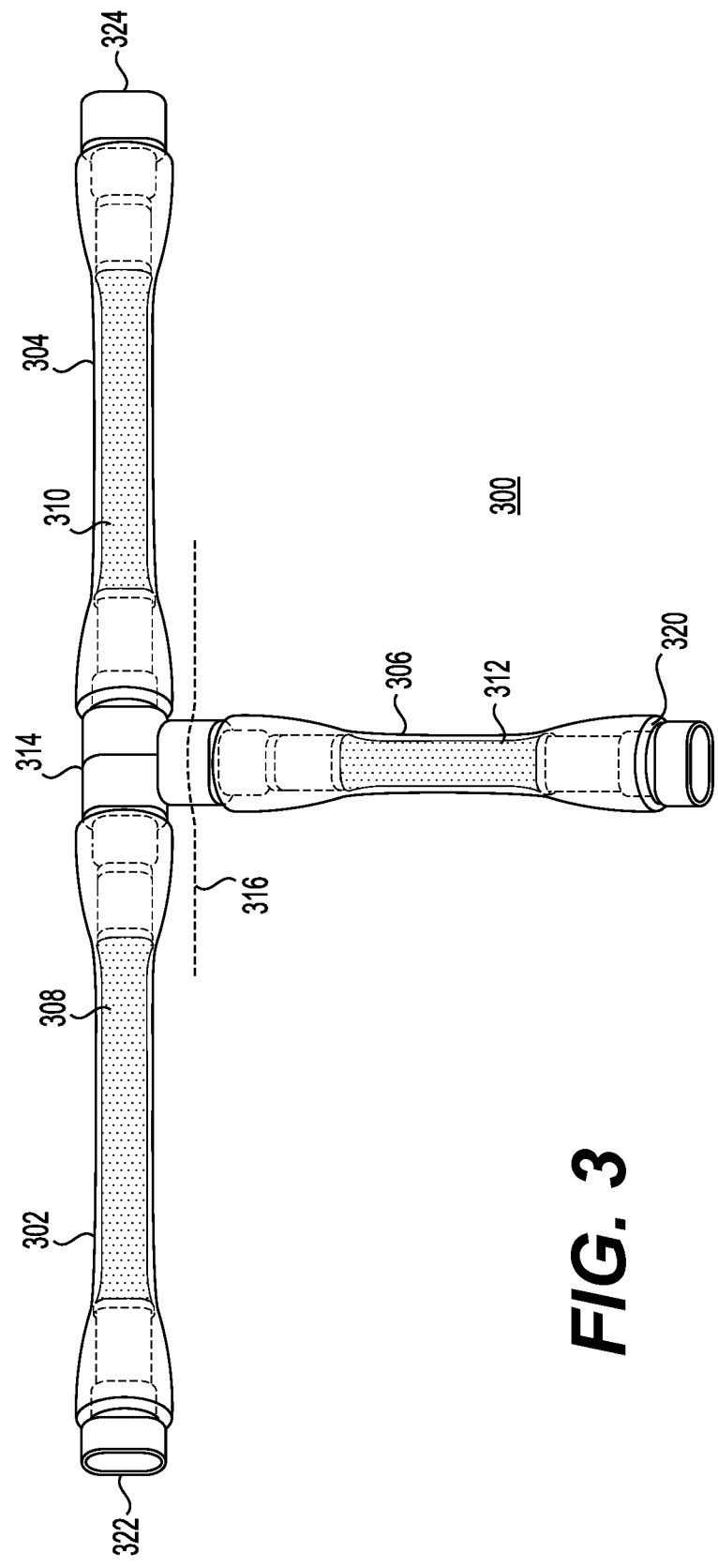

CONNECTORS WITH LIQUID METAL AND GAS PERMEABLE PLUGS

BACKGROUND

Flexible connectors may be used to connect electrical components housed in wearable devices or other devices that require certain freedom of movement among the various components of such devices. Because of the different form functions and sizes of wearable devices, flexible custom connectors may be used. Often, such custom connectors are made using tedious and time-consuming fabrication methods.

SUMMARY

In one example, the present disclosure relates to a circuit connector comprising a stretchable housing comprising liquid metal having a first viscosity, where the stretchable housing includes a first opening associated with a first end of the stretchable housing. The circuit connector may further include a first gas permeable plug inserted in the first opening, where the first gas permeable plug is not liquid permeable with respect to any liquids having at least the first viscosity.

In another aspect, the present disclosure relates to a method of manufacturing a circuit connector comprising a liquid metal having a first viscosity. The method may include inserting a first gas permeable plug in a first opening associated with a first end of a stretchable housing, where the first gas permeable plug is not liquid permeable with respect to any liquids having at least the first viscosity. The method may further include inserting a second gas permeable plug in a second opening associated with a second end of the stretchable housing, where the second gas permeable plug is not liquid permeable with respect to any liquids having at least the first viscosity. The method may further include at least partially filling the stretchable housing with the liquid metal supplied using any of the first opening or the second opening.

In yet another aspect, the present disclosure relates to a wearable device including a first circuit configured to perform a first function associated with the wearable device. The wearable device may further include a second circuit configured to perform a second function associated with the wearable device. The wearable device may further include at least one circuit connector interconnecting the first circuit and the second circuit. The at least one circuit connector may include a stretchable housing comprising liquid metal having a viscosity, where the stretchable housing includes an opening associated with an end of the stretchable housing. The at least one circuit connector may further include a gas permeable plug inserted in the opening, where the gas permeable plug is not liquid permeable with respect to any liquids having at least the first viscosity.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

FIG. 2 shows another circuit connector in accordance with one example;

FIG. 3 shows yet another circuit connector in accordance with one example;

DETAILED DESCRIPTION

Examples described in this disclosure relate to circuit connectors comprising liquid metal and methods of manufacturing such circuit connectors. Circuit connectors, including conductors fabricated from liquid metal comprising indium/gallium, may be useful in commercial manufacturing situations. The liquid metal may advantageously offer truly stretchable electronics particularly useful for wearable devices. Such connectors, however, may be difficult to manufacture in a commercial process. Certain examples described in the present disclosure advantageously enable a flexible tube to be easily filled with liquid metal and have attached commercial connectors without any leakage of the liquid metal.

In some examples, a sintered and plasma treated plastic, or other surface energy treated plastic, may be formed into plugs. Two of these plugs may be inserted into ends of a high percentage elongation elastomer tube. In other examples, bonded polyester fiber similarly surface treated may be formed into plugs and two of these may be inserted into the ends of a high percentage elongation elastomer tube. In either case, the tube may now be sealed and "dry." Using syringe filling methods, liquid metal (e.g., gallium/indium or mercury) may be injected into the tube. As the fluid enters the tube, air is displaced and vented through the gas permeable plug. As the liquid metal front comes into contact with the plug, capillary action may draw some of the liquid into the plug. The high surface energy from plasma treatment as well as small void volumes of the sintering process may arrest further migration of the fluid into the plug. The result may be a fully filled, stretchable tube with sealed ends. Commercial connectors may then be pressed into the exposed end of the plug to a plunge depth where it makes contact with the liquid metal. At this stage, any commercial circuit elements may be connected quickly and reliably. Similarly, any commercial circuit elements may be changed in minimal time. Use of the gas permeable, yet liquid arresting plugs may allow the process of filling a system of tubes with liquid metal to be performed during a later step in the manufacturing of a device, e.g., during the top-level assembly of the device.

Figure 1:
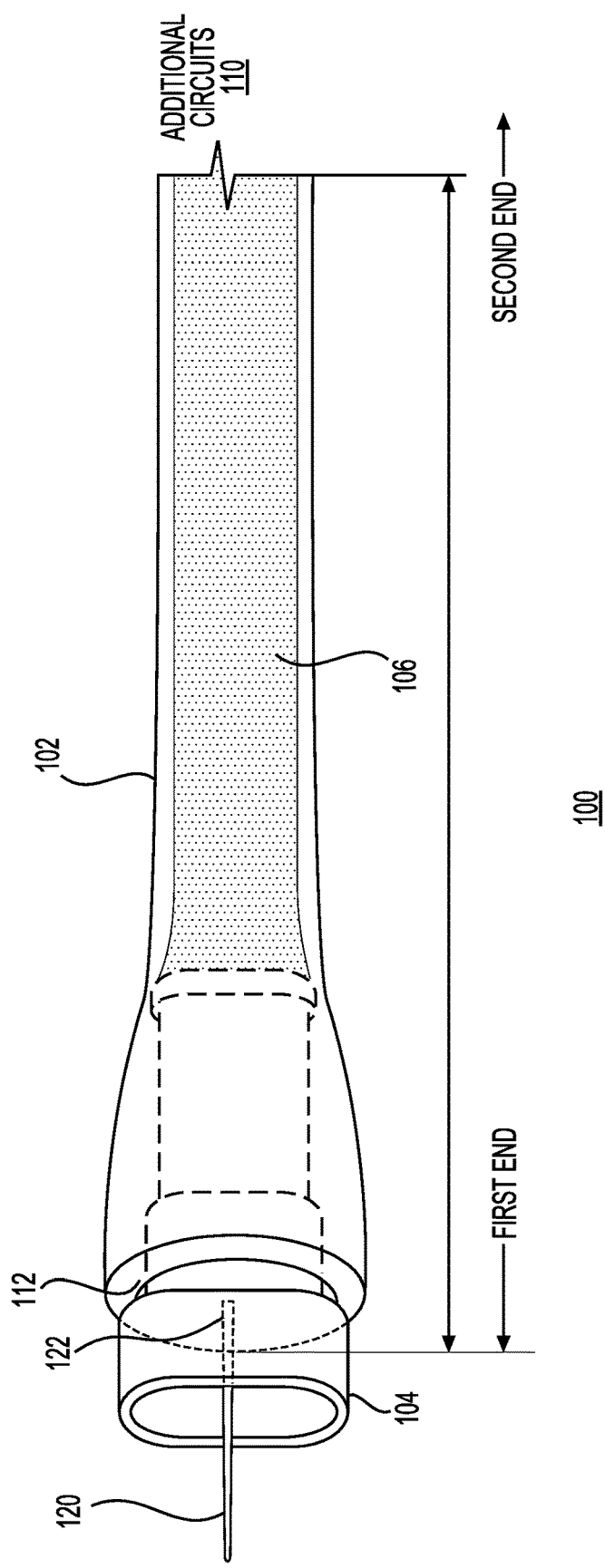
FIG. 1 shows a circuit connector in accordance with one example.

FIG. 1 shows a circuit connector 100 in accordance with one example. Circuit connector 100 may include a stretchable housing 102 that may be filled with liquid metal 106. In this example, circuit connector 100 may have two ends (e.g., the ends labeled as the first end and the second end). A gas permeable plug 104 may be inserted in an opening 112 of stretchable housing 102 at the first end of circuit connector 100. The other end (e.g., the end labeled as the second end) of circuit connector 100 may be coupled to additional circuits 110. In this example, stretchable housing 102 may be formed using high-percentage elongation elastomer materials. Liquid metal 106 may include a metal that is liquid at ambient temperatures. In this example, liquid metal may include a combination of indium and gallium. In one example, the colloidal blending of the two metals may include two indium molecules for every one of gallium molecules. While indium has a melting point of approximately 156 degrees Centigrade the combination of indium with gallium may be used because it has a melting point of approximately 30 degrees Centigrade. In another example, liquid metal may include mercury, which has a melting point of approximately −38 degrees Centigrade. Liquid metal 106 may have a viscosity associated with it.

With continued reference to FIG. 1, gas permeable plug 104 may be formed by sintered plastic that has been plasma treated. In this example, the combination of pressure and heat may bond plastic beads together to form the plugs. In another example, gas permeable plug 104 may be formed by chemically treating plastic with surfactants, such as soap. In addition, instead of plastic plugs, bonded polyester fibers may also be used to form gas permeable plugs by subjecting such fibers to chemical treatment. As part of this process, the fiber strands may be oriented in a way to ensure that the gas permeable plug is not liquid permeable.

Still referring to FIG. 1, liquid metal 106 may flow within stretchable housing 102 because of capillary action. After flowing for some distance, it may come to rest at a rest point. The rest point may be close or adjacent to an inner surface of gas permeable plug 104. An electrical connector, such as a bayonet type connector 120 may be inserted into gas permeable plug 104. In this example, bayonet type connector 120 may be inserted far enough to make a connection with liquid metal 106. Thus, in this example, portion 122 of bayonet type connector is shown overlapping between bayonet type connector and the rest point of liquid metal 106.

Although FIG. 1 shows the stretchable housing as having a tubular shape, the housing could have other shapes based on the requirements for the circuit connector. In addition, although FIG. 1 shows a certain shape of the gas permeable plug, it may have other shapes.

FIG. 2 shows a circuit connector 200 in accordance with one example. Circuit connector 200 may include a stretchable housing 202 that may be filled with liquid metal 206. Circuit connector 200 may further include another stretchable housing 204 that may be filled with liquid metal 208. The two housings may be interconnected via a gas permeable plug 216 that could be used to attach the two stretchable housings as shown in FIG. 2. In this example, circuit connector 200 may have two ends. After liquid metal 206 is filled into stretchable housing 202, a gas permeable plug 210 may be inserted in an opening of stretchable housing 202 at the first end of circuit connector 200. After liquid metal 208 is filled into stretchable housing 204, another gas permeable plug 212 may be inserted in an opening of stretchable housing 204 at the second end of circuit connector 200. The plugs may be formed in a similar manner as described with respect to FIG. 1. In addition, the materials used to form the various components shown in FIG. 2 may be used in a similar fashion as described with respect to FIG. 1.

FIG. 3 shows a circuit connector 300 in accordance with one example. Circuit connector 300 may include stretchable housings 302, 304, and 306 each of which may be filled with liquid metal 308, 310, and 312 respectively. Gas permeable plug 322 may be inserted into an opening of stretchable housing 302 as shown in FIG. 3. Similarly, a gas permeable plug 324 may be inserted into an opening of stretchable housing 304. In this example, circuit connector 300 may be formed into a T-shape during at least one stage of manufacturing by interconnecting a T-shaped gas permeable plug 314. After the T-shaped gas permeable plug arrangement is used to fill each of the stretchable housings, the portion that is shown below the dotted line 316 may be removed. Alternatively, another gas permeable plug may be inserted in opening 320. The plugs may be formed in a similar manner as described with respect to FIG. 1. In addition, the materials used to form the various components shown in FIG. 3 may be used in a similar fashion as described with respect to FIG. 1.

Figure 4:
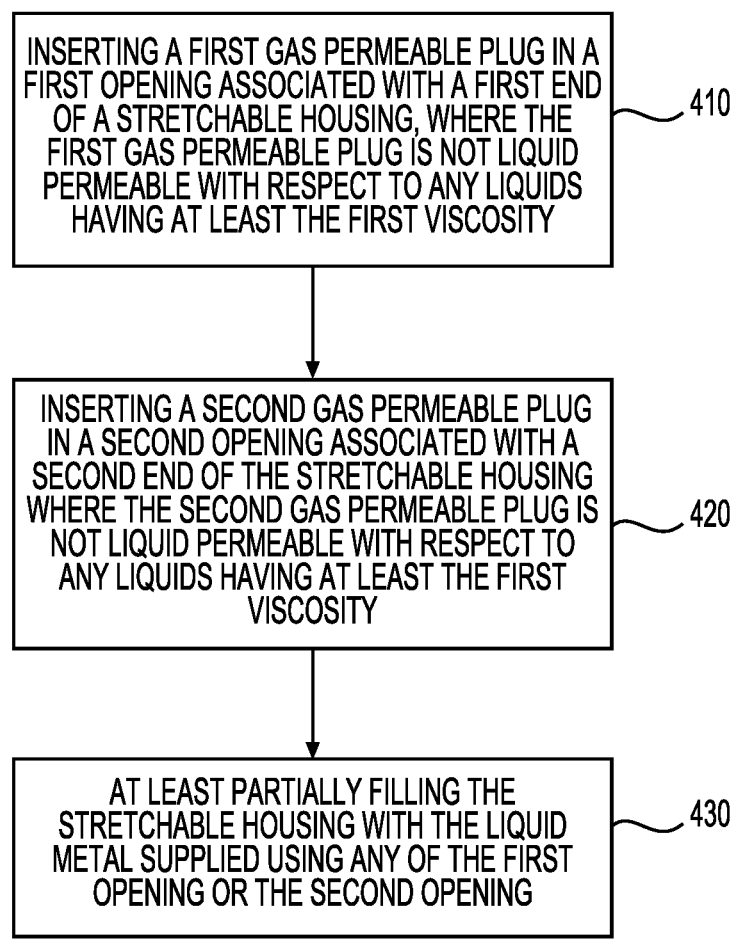
FIG. 4 is a flow chart of a method for manufacturing a stretchable circuit connector in accordance with one example.

FIG. 4 shows a flow chart 400 for a method for manufacturing connectors with gas permeable plugs in accordance with one example. This method may be used to manufacture circuit connectors 100, 200, 300, or other similar connectors with gas permeable plugs. Step 410 may include inserting a first gas permeable plug in a first opening associated with a first end of a stretchable housing, where the first gas permeable plug is not liquid permeable with respect to any liquids having at least the first viscosity. As part of this step any of the plugs described previously may be inserted in an opening associated with a stretchable housing.

Step 420 may include inserting a second gas permeable plug in a second opening associated with a second end of the stretchable housing, where the second gas permeable plug is not liquid permeable with respect to any liquids having at least the first viscosity. In one example, as part of this step a gas permeable plug that allows additional stretchable housings to be coupled may be used. Thus, as part of this step different shapes of gas permeable plugs may be inserted depending upon the requirements associated with a particular use of the circuit connector.

Step 430 may include at least partially filling the stretchable housing with the liquid metal supplied using any of the first opening or the second opening. As described earlier, this step may include using a syringe to fill the stretchable housing with the liquid metal. In addition, in a case where a T-shaped gas permeable plug is inserted in between two stretchable housings, the stretchable housing may be partially filled using the T-shaped gas permeable plug as described with respect to FIG. 3. Although FIG. 4 shows certain number of steps in a certain order, additional steps may be performed in a different order.

Figure 5:
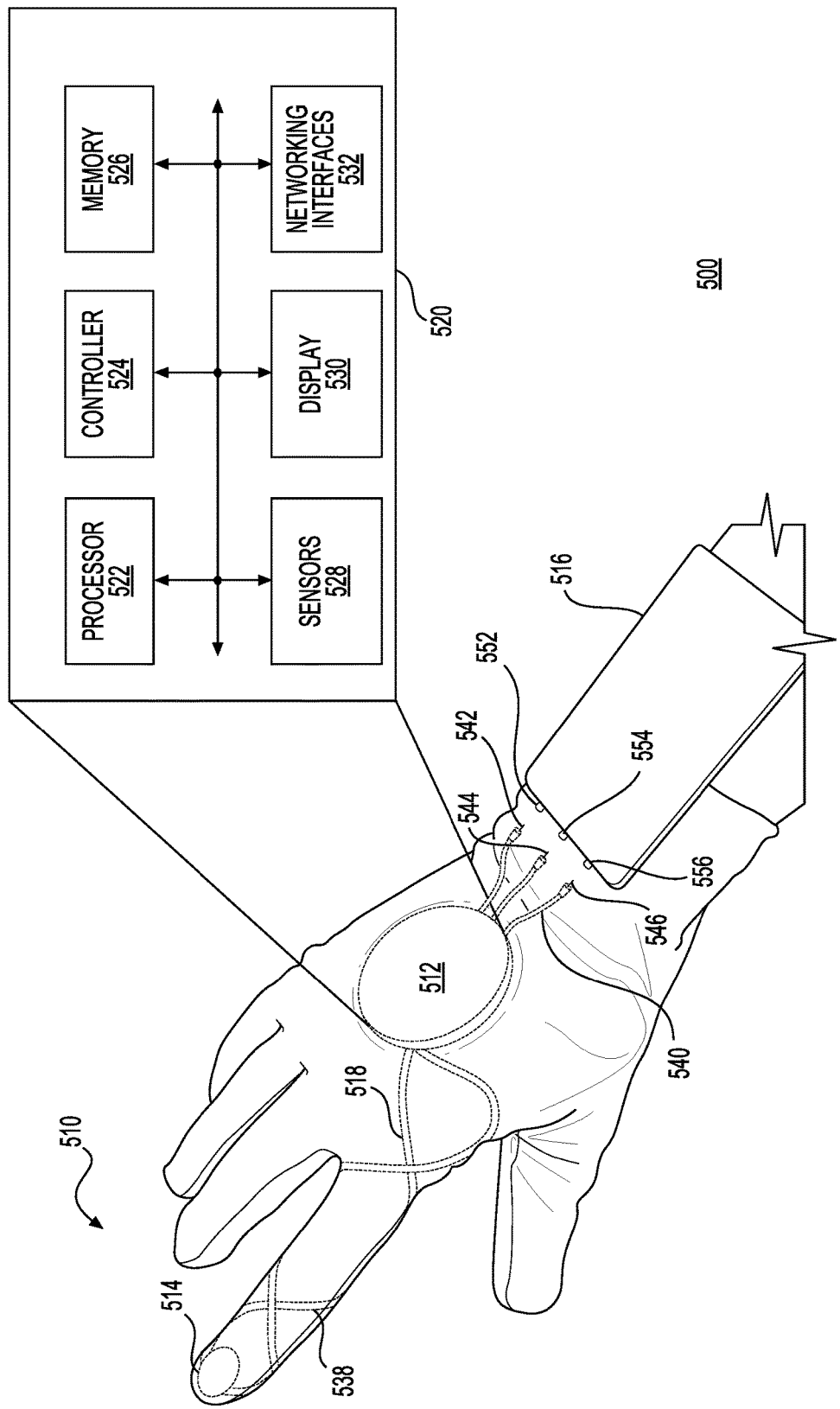
FIG. 5 is a diagram showing a usage of a stretchable connector in accordance with one example.

FIG. 5 shows an example configuration of the circuit connector's use with a wearable device 510. In this example, wearable device 510 is a glove including a first circuit 512 and a second circuit 514. First circuit 512 may be mounted inside the glove in the region shown in FIG. 5. Second circuit 514 may be mounted to the glove near one of the finger tips as shown in FIG. 5. Circuit connectors described earlier may be used to interconnect first circuit 512 and second circuit 514.

With continued reference to FIG. 5, example details of first circuit 512 are shown as part of a circuit substrate 520. Circuit substrate 520 may be a flexible substrate. Circuit substrate 520 may include a processor 522, a controller 524, a memory 526, sensors 528, display 530, and networking interfaces 532. Processor 522 may execute instructions stored in memory 526. Controller 524 may provide additional control functionality, as needed. Memory 526 may be any combination of non-volatile storage or volatile storage (e.g., flash memory, DRAM, SRAM, or other types of memories). Sensors 528 may include touch sensors, light intensity sensors, color temperature sensors, pressure sensors, proximity sensors, GPS sensors, and other types of sensors. Display 530 may be any type of display, such as LCD, LED, OLED, or other types of display. Network interfaces 532 may include communication interfaces, such as Ethernet, cellular radio, Bluetooth radio, UWB radio, or other types of wireless or wired communication interfaces. Although FIG. 5 shows circuit substrate 520 including a certain number of components arranged and coupled in a certain way, the circuit substrate may include fewer or additional components arranged and coupled differently.

With continued reference to FIG. 5, first circuit 512 may be coupled via circuit connectors 518 and 538 to second circuit 514. These circuit connectors may be manufactured using process similar to that described in FIG. 4. Bayonet connectors or other types of arrangements may be used to interconnect the liquid metal inside the circuit connectors with respective circuits shown in FIG. 5. Additional circuit connectors may be used to connect first circuit 512 with a device 516 located on the wrist of the same user who has the wearable device 510 on her hand. Thus, circuit connectors similar to circuit connector 540 may be used to interconnect first circuit 512 with device 516. Each of these circuit connectors may include bayonet type of interfaces (e.g., 542, 544, and 546) which may be coupled to complementary interfaces (e.g., 552, 554, and 556) located on device 516.

Although FIG. 5 shows one example configuration of the circuit connector's use, it could be used in other applications, such as robotics and other wearable devices. As an example, the circuit connectors described herein may be used as a service loop as part of a robotic arm or another part that moves in multiple dimensions. The stretchable circuit connectors when implemented as a service loop may advantageously provide a high degree of freedom of movement for movable robotic parts.

In conclusion, in one example, the present disclosure relates to a circuit connector comprising a stretchable housing comprising liquid metal having a first viscosity, where the stretchable housing includes a first opening associated with a first end of the stretchable housing. The circuit connector may further include a first gas permeable plug inserted in the first opening, where the first gas permeable plug is not liquid permeable with respect to any liquids having at least the first viscosity.

The liquid metal may comprise indium and gallium. The liquid metal may comprise mercury.

The stretchable housing may further include a second opening associated with a second end of the stretchable housing, where the second end is located opposite to the first end.

The circuit connector may further include a second gas permeable plug inserted in the second opening, where the second gas permeable plug is not liquid permeable with respect to any liquids having at least the first viscosity. Each of the first permeable gas plug and the second gas permeable plug may comprise sintered plastic beads or bonded plastic beads. Each of the first permeable gas plug and the second gas permeable plug may comprise chemically treated polyester fibers.

In another aspect, the present disclosure relates to a method of manufacturing a circuit connector comprising a liquid metal having a first viscosity. The method may include inserting a first gas permeable plug in a first opening associated with a first end of a stretchable housing, where the first gas permeable plug is not liquid permeable with respect to any liquids having at least the first viscosity. The method may further include inserting a second gas permeable plug in a second opening associated with a second end of the stretchable housing, where the second gas permeable plug is not liquid permeable with respect to any liquids having at least the first viscosity. The method may further include at least partially filling the stretchable housing with the liquid metal supplied using any of the first opening or the second opening.

The at least partially filling the stretchable housing with the liquid metal may comprise injecting the liquid metal into the stretchable housing using the first opening or the second opening.

Each of the first permeable gas plug and the second gas permeable plug may comprise sintered plastic beads or bonded plastic beads. Each of the first permeable gas plug and the second gas permeable plug may comprise chemically treated polyester fibers.

The liquid metal may comprise indium and gallium. The liquid metal may comprise mercury.

In yet another aspect, the present disclosure relates to a wearable device including a first circuit configured to perform a first function associated with the wearable device. The wearable device may further include a second circuit configured to perform a second function associated with the wearable device. The wearable device may further include at least one circuit connector interconnecting the first circuit and the second circuit. The at least one circuit connector may include a stretchable housing comprising liquid metal having a viscosity, where the stretchable housing includes an opening associated with an end of the stretchable housing. The at least one circuit connector may further include a gas permeable plug inserted in the opening, where the gas permeable plug is not liquid permeable with respect to any liquids having at least the first viscosity.

The liquid metal may comprise indium and gallium. The liquid metal may comprise mercury. The gas permeable plug may comprise sintered plastic beads, bonded plastic beads, or chemically treated polyester fibers.

It is to be understood that the methods, modules, and components depicted herein are merely exemplary. Alternatively, or in addition, the functionally described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality.

Some of the functionality associated with the examples described in this disclosure can also include instructions stored in a non-transitory media. The term "non-transitory media" as used herein refers to any media storing data and/or instructions that cause a machine, such as a processor, to operate in a specific manner. Exemplary non-transitory media include non-volatile media and/or volatile media. Non-volatile media include, for example, a hard disk, a solid-state drive, a magnetic disk or tape, an optical disk or tape, a flash memory, an EPROM, NVRAM, PRAM, or other such media, or networked versions of such media. Volatile media include, for example, dynamic memory, such as, DRAM, SRAM, a cache, or other such media. Non-transitory media is distinct from, but can be used in conjunction with transmission media. Transmission media is used for transferring data and/or instruction to or from a machine. Exemplary transmission media, include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A circuit connector comprising:
   a stretchable housing comprising liquid metal having a first viscosity, wherein the stretchable housing includes a first opening associated with a first end of the stretchable housing; and
   a first gas permeable plug inserted in the first opening, wherein the first gas permeable plug is not liquid permeable with respect to any liquids having at least the first viscosity.

2. The circuit connector of claim 1, wherein the liquid metal comprises indium and gallium.

3. The circuit connector of claim 1, wherein the stretchable housing further includes a second opening associated with a second end of the stretchable housing, wherein the second end is located opposite to the first end.

4. The circuit connector of claim 3 further comprising a second gas permeable plug inserted in the second opening, wherein the second gas permeable plug is not liquid permeable with respect to any liquids having at least the first viscosity.

5. The circuit connector of claim 1, wherein the first gas permeable plug comprises sintered plastic beads.

6. The circuit connector of claim 1, wherein the first gas permeable plug comprises chemically treated polyester fibers.

7. The circuit connector of claim 4, wherein the second gas permeable plug comprises bonded plastic beads.

8. The circuit connector of claim 4, wherein the second gas permeable plug comprises chemically treated polyester fibers.

9. The circuit connector of claim 1, wherein the liquid metal comprises mercury.

10. A method of manufacturing a circuit connector comprising a liquid metal having a first viscosity, the method comprising:
    inserting a first gas permeable plug in a first opening associated with a first end of a stretchable housing, wherein the first gas permeable plug is not liquid permeable with respect to any liquids having at least the first viscosity;
    inserting a second gas permeable plug in a second opening associated with a second end of the stretchable housing, wherein the second gas permeable plug is not liquid permeable with respect to any liquids having at least the first viscosity; and
    at least partially filling the stretchable housing with the liquid metal supplied using any of the first opening or the second opening.

11. The method of claim 10, wherein the at least partially filling the stretchable housing with the liquid metal comprises injecting the liquid metal into the stretchable housing using the first opening or the second opening.

12. The method of claim 10, wherein each of the first gas permeable plug and the second gas permeable plug comprises sintered plastic beads.

13. The method of claim 10, wherein each of the first gas permeable plug and the second gas permeable plug comprises chemically treated polyester fibers.

14. The method of claim 10, wherein the liquid metal comprises indium and gallium.

15. The method of claim 10, wherein the liquid metal comprises mercury.

16. A wearable device comprising:
    a first circuit configured to perform a first function associated with the wearable device;
    a second circuit configured to perform a second function associated with the wearable device; and
    at least one circuit connector interconnecting the first circuit and the second circuit, wherein the at least one circuit connector comprises:
    a stretchable housing comprising liquid metal having a first viscosity, wherein the stretchable housing includes an opening associated with an end of the stretchable housing, and
    a gas permeable plug inserted in the opening, wherein the gas permeable plug is not liquid permeable with respect to any liquids having at least the first viscosity.

17. The wearable device of claim 16, wherein the liquid metal comprises indium and gallium.

18. The wearable device of claim 16, wherein the gas permeable plug comprises sintered plastic beads.

19. The wearable device of claim 16, wherein the gas permeable plug comprises chemically treated polyester fibers.

20. The wearable device of claim 16, wherein the liquid metal comprises mercury.

* * * * *